(12) United States Patent
Glickman

(10) Patent No.: US 9,636,996 B1
(45) Date of Patent: May 2, 2017

(54) HIGH-EFFICIENCY BODY-ON-FRAME AIR DEFLECTOR SEALING SYSTEM

(71) Applicant: FORD GLOBAL TECHNOLOGIES, LLC, Dearborn, MI (US)

(72) Inventor: David Brian Glickman, Southfield, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 14/877,405

(22) Filed: Oct. 7, 2015

(51) Int. Cl.
*B60K 11/08* (2006.01)
(52) U.S. Cl.
CPC .................................. *B60K 11/08* (2013.01)
(58) Field of Classification Search
None
See application file for complete search history.

(56) References Cited

U.S. PATENT DOCUMENTS 8,408,344 B2 * 4/2013 Williams ............... B60K 11/04
180/68.4
2009/0188100 A1 7/2009 Durney et al.

FOREIGN PATENT DOCUMENTS

DE  102007002679 A1  7/2008
EP     1998090 A2    12/2008
WO   2014111211 A2   7/2014

OTHER PUBLICATIONS

English machine translation of DE102007002679A1.
English machine translation of WO2014111211A2.

* cited by examiner

*Primary Examiner* — John Walters
*Assistant Examiner* — Hilary L John
(74) *Attorney, Agent, or Firm* — Jason Rogers; King & Schickli PLLC

(57) ABSTRACT

An airflow sealing system for a body-on-frame vehicle includes at least one flexible interface configured to control airflow between a vehicle body-mounted cooling pack assembly and a vehicle chassis-mounted air intake assembly. The chassis-mounted air intake assembly may be a lower air scoop/deflector. The at least one flexible interface includes a first end attached to a portion of the chassis-mounted air intake assembly and a second end slidably contacting a portion of the body-mounted cooling pack assembly. The second end may be slidably biased against a sealing plenum associated with the body-mounted cooling pack assembly. The at least one flexible interface may define a wiper seal between the body-mounted cooling pack assembly and the chassis-mounted air intake assembly. Chassis-mounted air intake assemblies and body-on-frame vehicles including the airflow sealing system are provided.

16 Claims, 6 Drawing Sheets

HIGH-EFFICIENCY BODY-ON-FRAME AIR DEFLECTOR SEALING SYSTEM

TECHNICAL FIELD

This disclosure relates generally to airflow deflectors. More particularly, the disclosure relates to an air deflector for a body-on-frame vehicle, including a flexible interface regulating airflow between a vehicle body-mounted cooling pack assembly and a vehicle chassis-mounted air intake assembly.

BACKGROUND

As is known, body-on-frame vehicles include a rigid chassis/frame supporting the vehicle drivetrain and a separate body mounted to that frame. While tending to be heavier than unibody vehicle constructions, body-on-frame vehicle construction provides certain advantages, including comparative simplicity of design, construction, and modification, high frame torsional strength, reduced exterior noise due to isolation of the body from the frame such as with rubber pads, and ease of repair of damage. For this reason, body-on-frame is often the construction method of choice for certain vehicle types including pickup trucks, truck-based sport-utility vehicles, off-road vehicles, certain vehicles subjected to heavy towing stress, and others.

Body-on-frame vehicles which specify advanced cooling requirements, which are common in certain vehicle types such as pickup trucks, rely on multiple sealing parts in the vehicle front end and under the vehicle to draw cooling air into the vehicle cooling pack (radiator(s), condenser, oil cooler, transmission cooler, power steering cooler, etc.). However, body-on-frame vehicles present a unique design challenge in that certain sealing components must be installed on the vehicle chassis/frame, but others must be installed on portions of the vehicle body. Still other sealing components are required to bridge the vehicle chassis/frame and vehicle body. Because in a body-on-frame vehicle there is typically relative movement between the body and the frame, sealing components bridging the body and frame must compensate for that relative movement.

Typically, this compensation for relative movement between the body and frame is accomplished by designing "slack" in the sealing components, i.e. by providing a seal that at least partially regulates airflow despite relative movement between the vehicle body and frame. While substantially effective, such slack decreases cooling efficiency. This can be a significant issue in light of modern requirements for vehicle efficiency, safety, and other standards requiring high-performance sealing systems. Accordingly, a need in the art exists for sealing systems for body-on-frame vehicles which both accommodate the relative movement between the vehicle body and frame, but which also provide highly efficient airflow seals to meet modern cooling standards.

SUMMARY

In accordance with the purposes and benefits described herein, in one aspect the present disclosure is directed to an airflow sealing system for a body-on-frame vehicle, comprising at least one flexible interface configured to control airflow between a vehicle body-mounted cooling pack assembly and a vehicle chassis-mounted air intake assembly. In embodiments, the chassis-mounted air intake assembly is a lower air scoop/deflector. The at least one flexible interface includes a first end attached to a portion of the chassis-mounted air intake assembly and a second end slidably contacting a portion of the body-mounted cooling pack assembly, the second end in embodiments being slidably biased against at least a sealing plenum associated with the body-mounted cooling pack assembly. In embodiments, the at least one flexible interface defines a wiper seal between the body-mounted cooling pack assembly and the chassis-mounted air intake assembly.

In another aspect, a chassis-mounted air intake assembly for a body-on-frame vehicle is described, comprising a vehicle chassis-mounted front air scoop/deflector and an airflow sealing system configured to control airflow between the front lower air scoop/deflector and a vehicle body-mounted cooling pack. In embodiments, the front air scoop/deflector is a lower air scoop/deflector associated with a vehicle front bumper. As described, in embodiments the airflow sealing system comprises at least one flexible interface including a first end attached to a portion of the chassis-mounted front lower air scoop deflector and a second end contacting a portion of the body-mounted cooling pack assembly. In embodiments, the second end is slidably biased against at least a sealing plenum associated with the body-mounted cooling pack assembly to provide the airflow seal. The at least one flexible interface may define a wiper seal between the body-mounted cooling pack assembly and the chassis-mounted air intake assembly.

In yet another aspect, a body-on-frame vehicle is provided, comprising a chassis element, a body element, a chassis-mounted front air intake assembly, a body-mounted cooling pack, and an airflow sealing system configured to control airflow between the chassis-mounted lower air scoop/deflector and the body-mounted cooling pack. In embodiments, the airflow sealing system comprises at least one flexible interface bridging the chassis-mounted lower air scoop/deflector and the body-mounted cooling pack. The flexible interface includes in a first end attached to a portion of the chassis-mounted air intake assembly and a second end contacting a portion of the body-mounted cooling pack, the second end in embodiments being slidably biased against at least a sealing plenum associated with the body-mounted cooling pack. In embodiments, the at least one flexible interface defines a wiper seal between the body-mounted cooling pack assembly and the chassis-mounted air intake assembly.

In the following description, there are shown and described several preferred embodiments of the described vehicle body-on-frame sealing system. As it should be realized, the described systems and devices are capable of other, different embodiments and its several details are capable of modification in various, obvious aspects all without departing from the sealing system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle body-on-frame sealing system and together with the description serve to explain certain principles thereof. In the drawing figures.

Reference will now be made in detail to the present preferred embodiments of the vehicle body-on-frame sealing system of the disclosure, examples of which are illustrated in the accompanying drawing figures.

DETAILED DESCRIPTION

Figure 1:
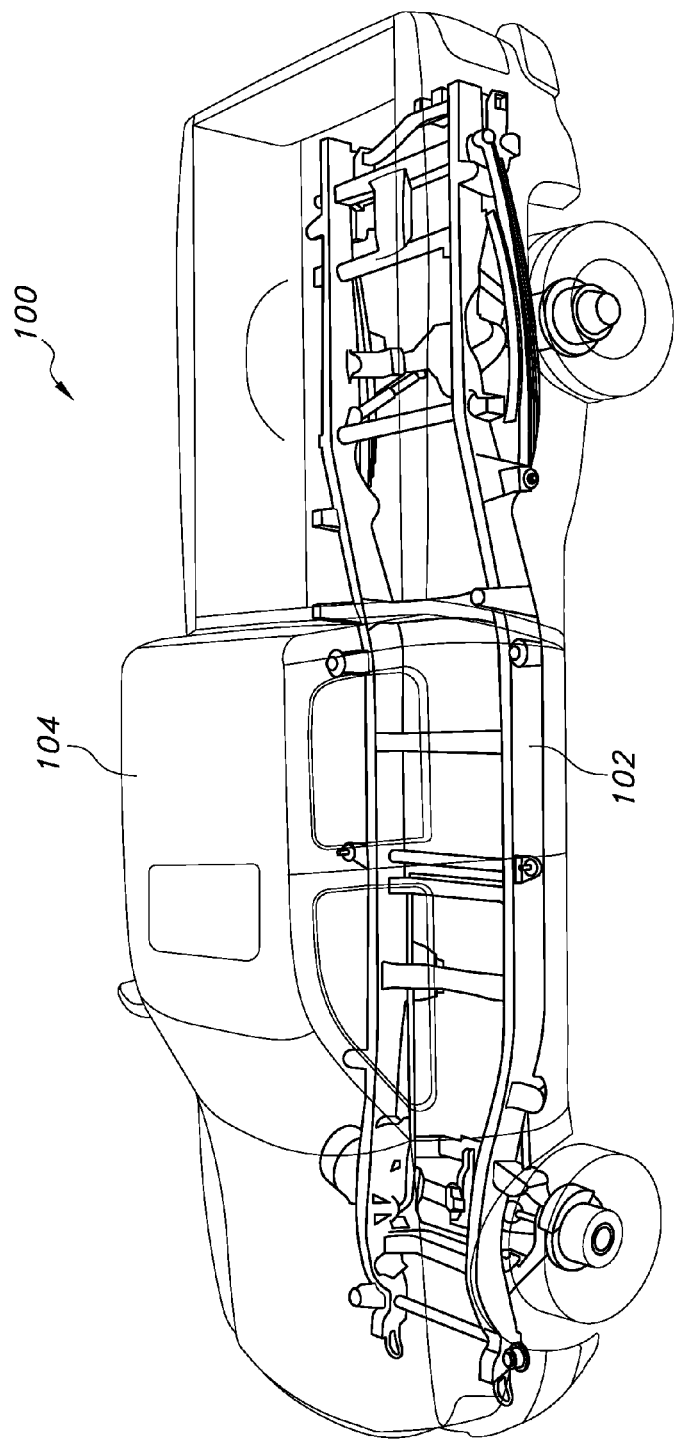
FIG. 1 depicts a body-on-frame motor vehicle.

Reference is now made to FIG. 1 illustrating a body-on-frame vehicle 100 including a chassis/frame element 102 which supports the vehicle drivetrain (not shown) and a body element 104. As summarized above, modern body-on-frame vehicles 100 rely on multiple sealing parts in the vehicle front end and under the vehicle to direct cooling air to the vehicle cooling pack (radiator(s), condenser, oil cooler, transmission cooler, power steering cooler, etc.) and/or to underbody components requiring cooling, and present unique design challenges relating to installation of certain sealing components on the vehicle chassis 102 (referred to herein as the upper sealing system), installation of other sealing components on portions of the vehicle body 104 (referred to herein as the lower sealing system), and installation of still other sealing components which are required to bridge the lower and upper sealing systems, all while compensating for relative movement between the vehicle chassis element 102 and the vehicle body element 104 and any sealing components installed on those elements.

Figure 2:
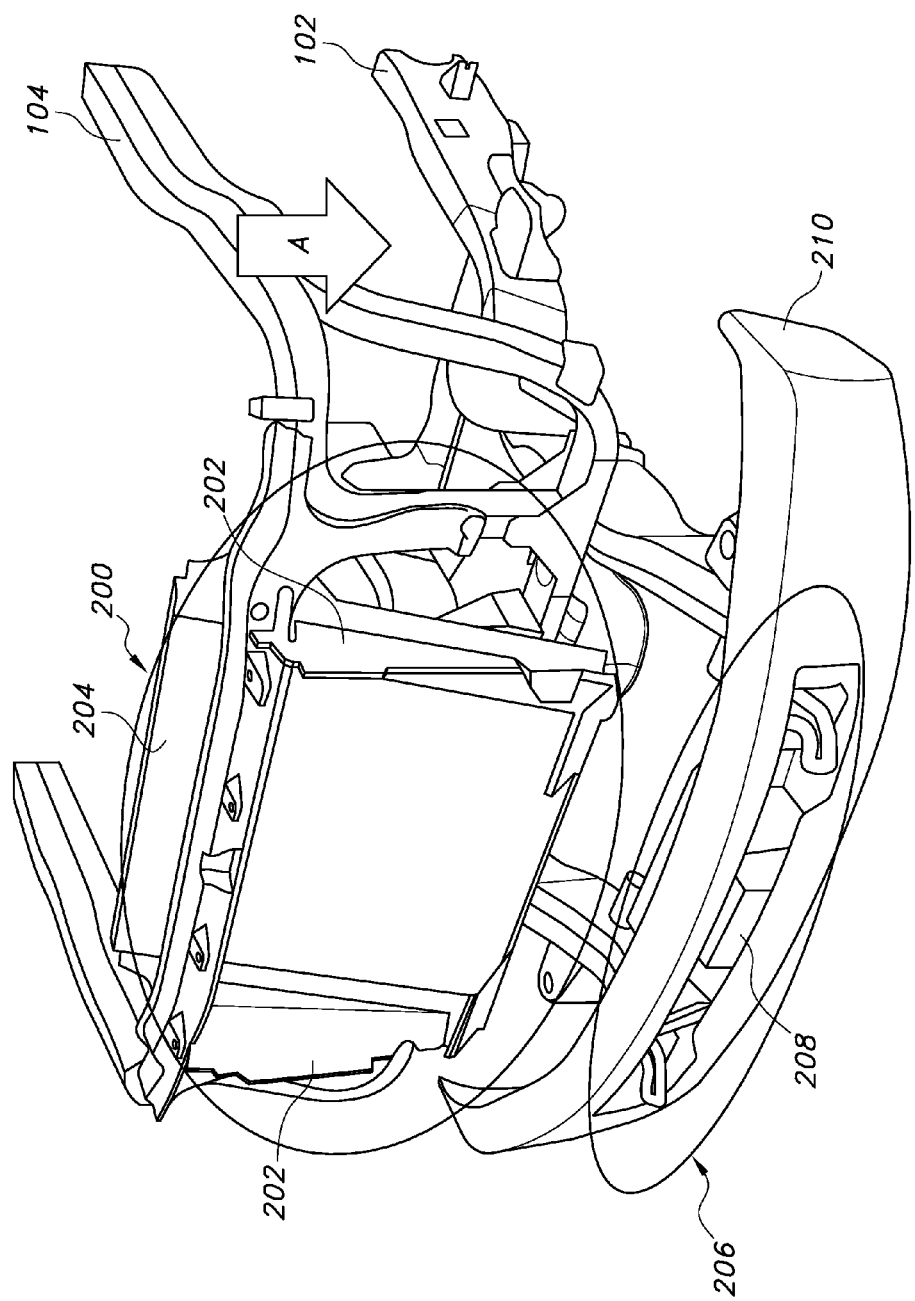
FIG. 2 is a front perspective view of a vehicle chassis and body prior to decking.
Figure 3:
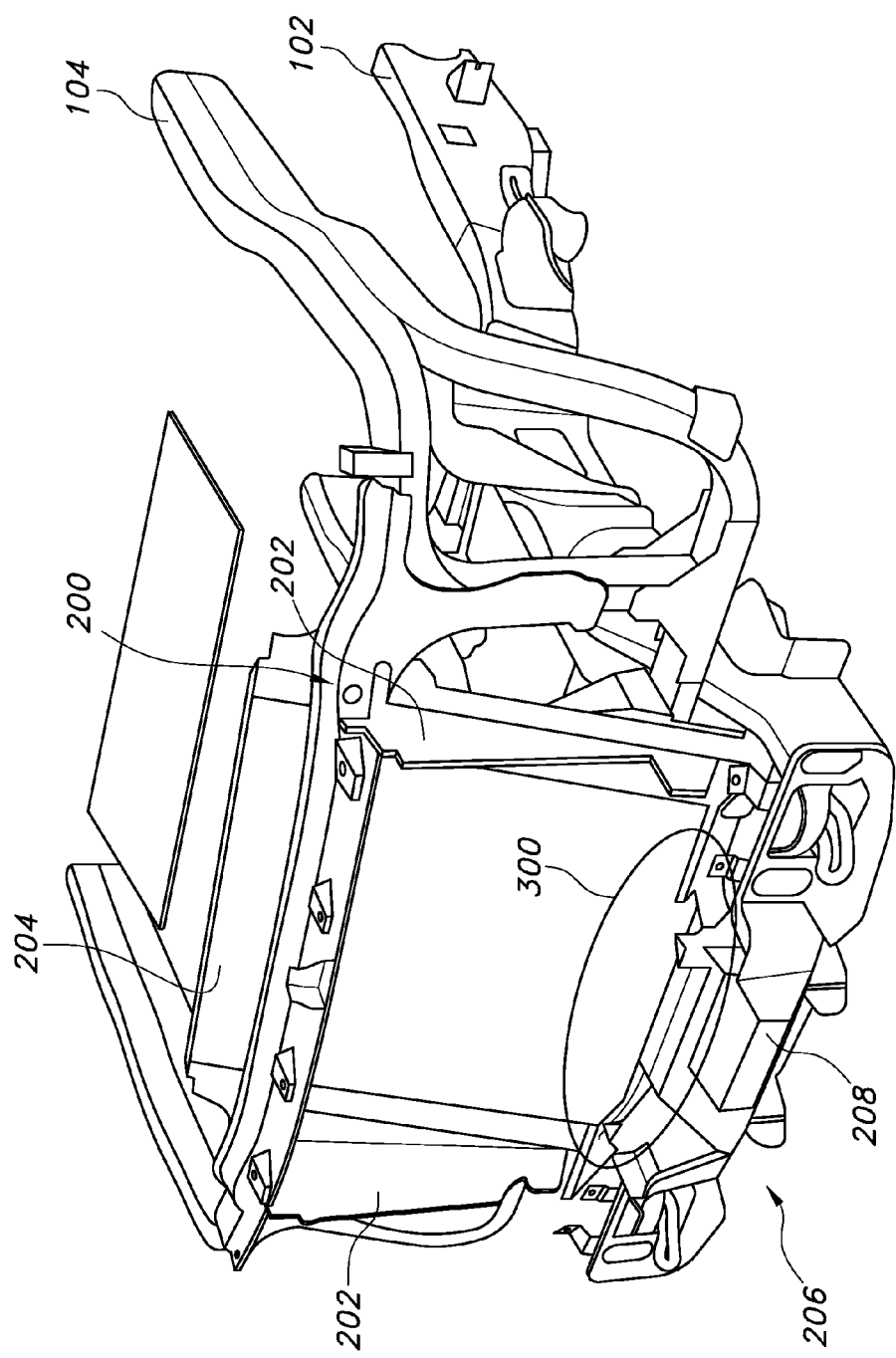
FIG. 3 is a front perspective view of the vehicle chassis and body of FIG. 2 after decking.

With reference to FIG. 2, the front end assembly of vehicle 100 is shown in isolation, including the vehicle chassis 102 and a portion of the vehicle body 104. As shown, the chassis 102 and body 104 are depicted prior to a fully decked position, i.e. before mounting the body to the frame (see arrow A). An upper airflow deflecting assembly 200 includes at least side deflectors 202 which on vehicle assembly are attached to a grille opening reinforcement (GOR; not shown for convenience) and an upper airflow deflector 204. A lower airflow deflecting assembly 206 may include a front airscoop/deflector 208, which when the vehicle is assembled is disposed substantially behind a vehicle front bumper 210. In the fully decked position (see FIG. 3), i.e. on mounting of the body 104 to the chassis 102, an interface 300 is defined between the upper airflow deflecting assembly 200 and the lower airflow deflecting assembly 206.

Figure 4:
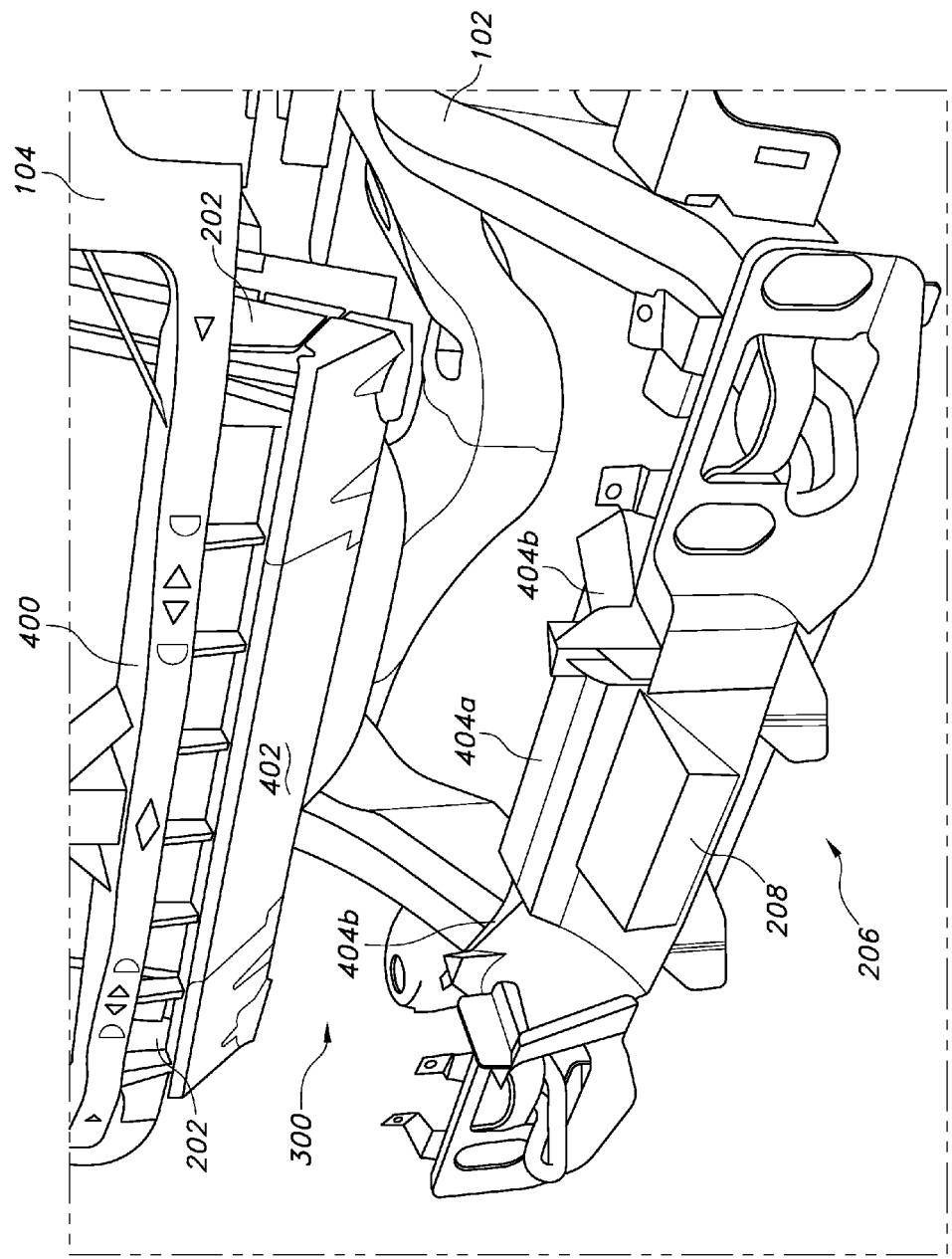
FIG. 4 depicts an isolated view of a portion of the vehicle chassis and body of FIG. 2, including a sealing system according to the present disclosure.

Interface 300 is shown in greater detail in FIG. 4, which also shows a GOR 400 to which side deflectors 202 are attached as described above. A sealing plenum 402 is associated with the upper airflow deflecting assembly 200, which partially controls airflow to a cooling pack (radiator(s), condenser, oil cooler, transmission cooler, power steering cooler, etc.; not shown) of the vehicle 100. As will be appreciated, because of relative movement between the vehicle body 104 and the vehicle chassis 102, sealing plenum 402, which does not attach in any way to the chassis 102, cannot completely control the airflow path to the cooling pack. Thus, efficiency of the direction of airflow to the cooling pack is compromised.

Figure 5:
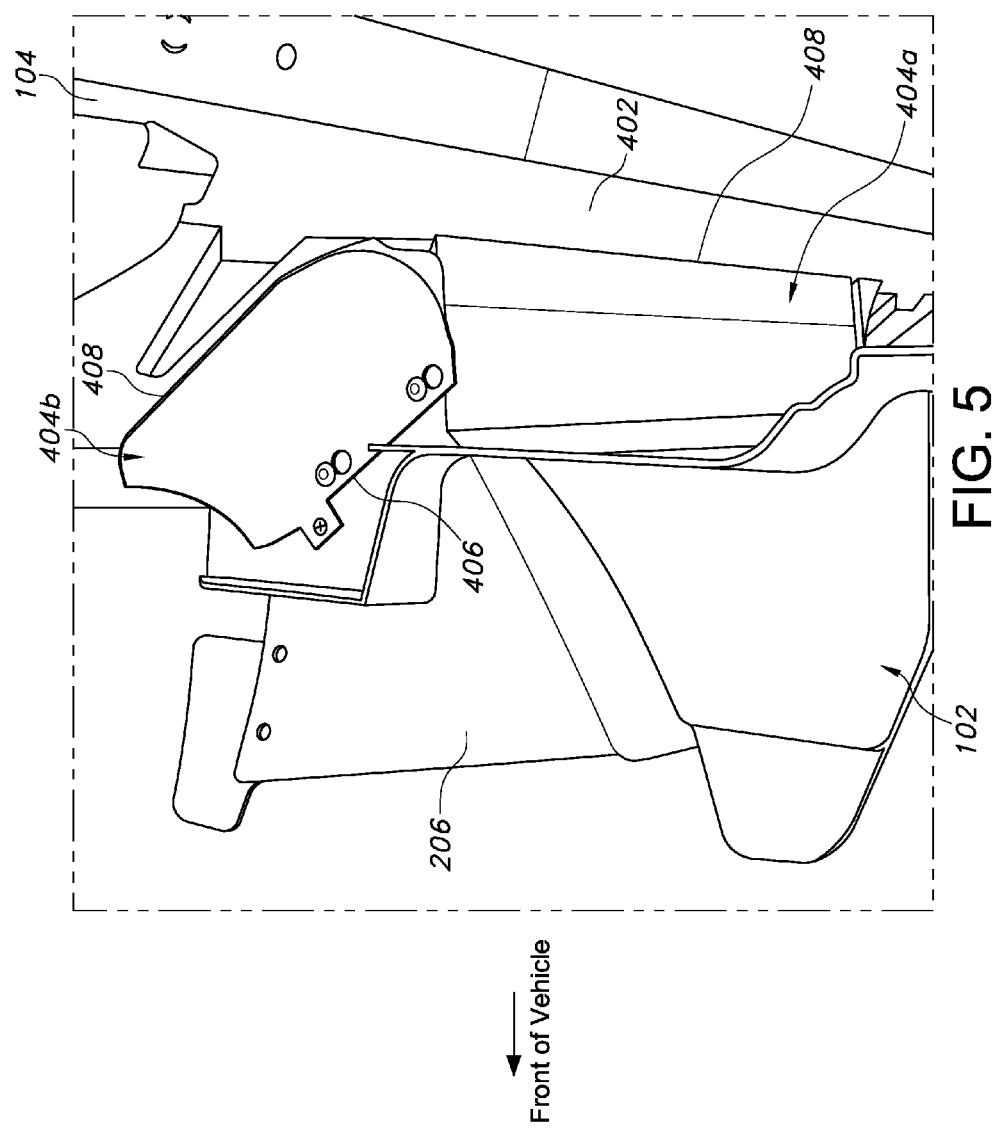
FIG. 5 is a side view of the sealing system of FIG. 4.

To solve this problem, one or more flexible interfaces 404 are provided as shown, mounted to a portion of the vehicle chassis 102 adjacent the lower airflow deflecting assembly 206. As best shown in FIG. 5, the one or more flexible interfaces 404 are attached at a first end 406 to a portion of the vehicle chassis 102, adjacent to the lower airflow deflecting assembly 206. Any suitable fasteners (one or more bolts, screws, rivets, etc.) are contemplated for use. For reasons which will be described in greater detail below, a second end of the one or more flexible interfaces 404 are not attached to any element of the vehicle 100. In an embodiment as depicted (see FIG. 4), a central flexible interface 404a and two side flexible interfaces 404b are provided.

Figure 6:
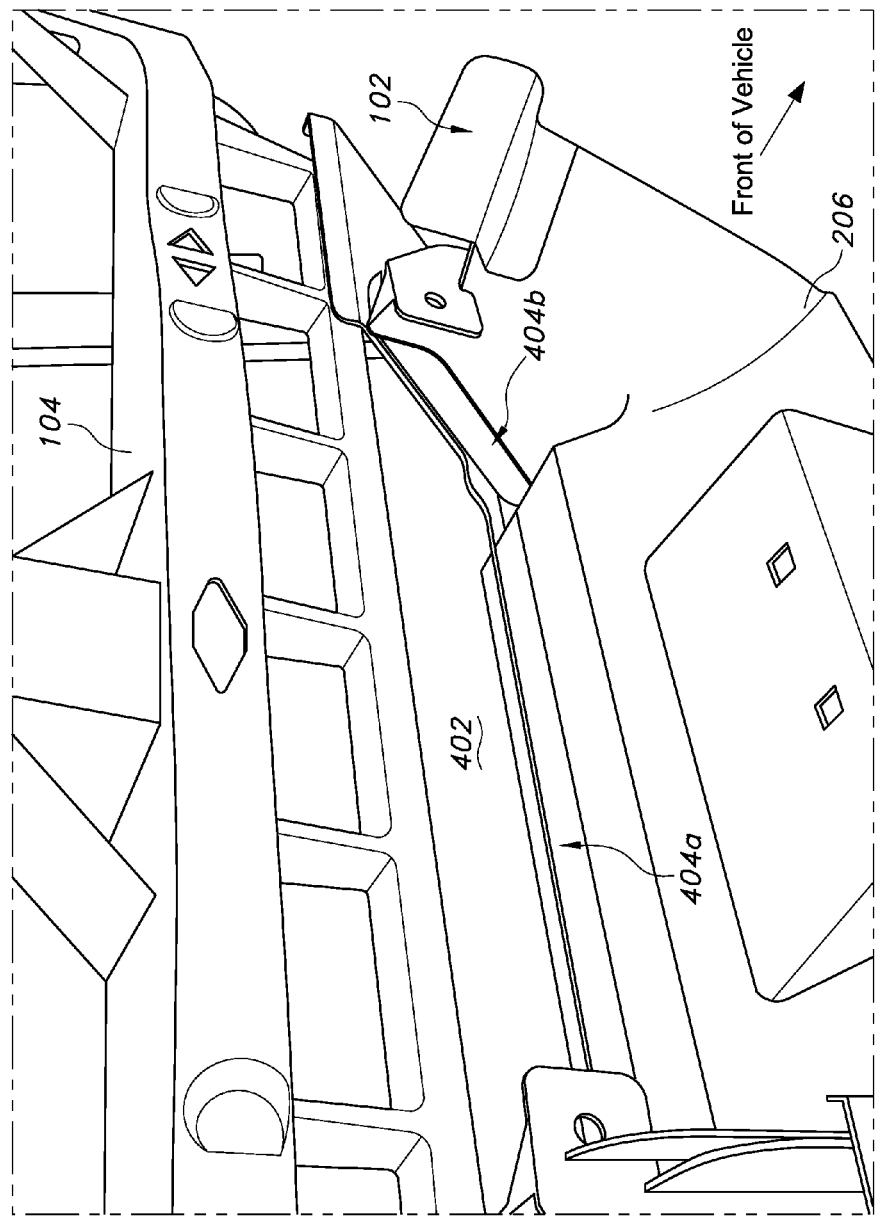
FIG. 6 is a front perspective view of the sealing system of FIG. 4.

As shown in FIGS. 5 and 6, on assembly/decking of the vehicle body 104 to the chassis 102, the second end 408 of the one or more flexible interfaces 404a, 404b slidably contact a portion of the upper airflow deflecting assembly 200 at interface 300. In the depicted embodiment, central flexible interface 404a slidably contacts sealing plenum 402, and side flexible interfaces 404b contact a portion of the vehicle body 104. By this slidable contact, a wiper seal is formed, which as is known creates and maintains a suitable seal during relative motion between the two surfaces being sealed. Thus, despite any relative motion between chassis 102 and body 104, the desired airflow seal is established and maintained. The described contact/airflow seal is established and maintained during decking of the chassis 102 and body 104, and also during dynamic and static vehicle operation after assembly.

As will be appreciated, by the described sealing system a high-efficiency seal is provided imposing little to no stress on any fasteners used, since only one end of the described flexible interface 404 is actually directly attached to any portion of the vehicle 100. The described sealing system further obviates any requirement of a direct connection between the vehicle upper and lower airflow deflecting or airflow sealing systems. There is likewise no need for precise alignment of the upper and lower sealing systems during vehicle assembly to provide the desired airflow seal, and further no sealing parts must be installed at all during line assembly of the vehicle. Rather, all needed sealing parts/components are attached to the vehicle body and/or frame prior to decking, thus decreasing labor and associated costs during vehicle assembly.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An airflow sealing system for a body-on-frame vehicle, comprising at least one flexible interface configured to control an airflow between a vehicle body-mounted cooling pack assembly and a vehicle chassis-mounted air intake assembly.

2. The system of claim 1, wherein the chassis-mounted air intake assembly is a lower air scoop/deflector.

3. The system of claim 1, wherein the at least one flexible interface includes a first end attached to a portion of the chassis-mounted air intake assembly and a second end slidably contacting a portion of the body-mounted cooling pack assembly.

4. The system of claim 3, wherein the second end is slidably biased against at least a sealing plenum associated with the body-mounted cooling pack assembly.

5. The system of claim 1, wherein the at least one flexible interface defines a wiper seal between the body-mounted cooling pack assembly and the chassis-mounted air intake assembly.

6. A vehicle including the system of claim 1.

7. A chassis-mounted air intake assembly for a body-on-frame vehicle, comprising:
   a vehicle chassis-mounted front air scoop/deflector; and
   an airflow sealing system configured to control an airflow between the front lower air scoop/deflector and a vehicle body-mounted cooling pack, wherein the airflow sealing system comprises at least one flexible interface including a first end attached to a portion of the chassis-mounted front lower air scoop deflector and a second end slidably contacting a portion of the body-mounted cooling pack assembly.

8. The assembly of claim 7, wherein the front air scoop/deflector is a lower air scoop/deflector.

9. The assembly of claim 7, wherein the second end is slidably biased against at least a sealing plenum associated with the body-mounted cooling pack assembly.

10. The assembly of claim 7, wherein the at least one flexible interface defines a wiper seal between the body-mounted cooling pack assembly and the chassis-mounted air intake assembly.

11. A vehicle including the assembly of claim 7.

12. A body-on-frame vehicle, comprising:
   a chassis element;
   a body element;
   a chassis-mounted front air intake assembly;
   a body-mounted cooling pack; and
   an airflow sealing system configured to control an airflow between the chassis-mounted lower air scoop/deflector and the body-mounted cooling pack, wherein the airflow sealing system comprises at least one flexible interface bridging the chassis-mounted lower air scoop/deflector and the body-mounted cooling pack.

13. The vehicle of claim 12, wherein the at least one flexible interface includes a first end attached to a portion of the chassis-mounted air intake assembly and a second end slidably contacting a portion of the body-mounted cooling pack.

14. The vehicle of claim 12, wherein the second end is slidably biased against at least a sealing plenum associated with the body-mounted cooling pack.

15. The vehicle of claim 13, wherein the at least one flexible interface defines a wiper seal between the body-mounted cooling pack assembly and the chassis-mounted air intake assembly.

16. The vehicle of claim 12, wherein the chassis-mounted air intake assembly is a lower air scoop/deflector.

\* \* \* \* \*